United States Patent

Sanders

[15] 3,641,941
[45] Feb. 15, 1972

[54] AUTOMATIC LOCKING MOVABLE BULKHEAD

[72] Inventor: Wes E. Sanders, 1922 E. 96th Street, Chicago, Ill. 60617

[22] Filed: May 4, 1970

[21] Appl. No.: 34,352

[52] U.S. Cl............................................105/376, 105/369 B
[51] Int. Cl..................................................B60p 7/14
[58] Field of Search.....................................105/369 B, 376

[56] References Cited

UNITED STATES PATENTS

| | | | |
|---|---|---|---|
| 3,017,842 | 1/1962 | Nampa | 105/376 |
| 2,982,230 | 5/1961 | Chapman | 105/369 B |
| 3,411,459 | 11/1968 | Hyatt | 105/369 B |
| 3,007,423 | 11/1961 | Maharick | 105/376 |
| 3,112,712 | 12/1963 | Cisco | 105/376 |
| 3,283,729 | 11/1966 | Lamport et al. | 105/376 |
| 3,520,256 | 7/1970 | Gutridge | 105/376 |

*Primary Examiner*—Drayton E. Hoffman
*Attorney*—Sabin C. Bronson

[57] ABSTRACT

A movable bulkhead assembly for a freight vehicle. Said bulkhead is movable along rails on opposite sides of the vehicle and has gravity actuated latch plates engageable with keeper notches in the rails to hold the bulkhead in a selected position.

10 Claims, 6 Drawing Figures

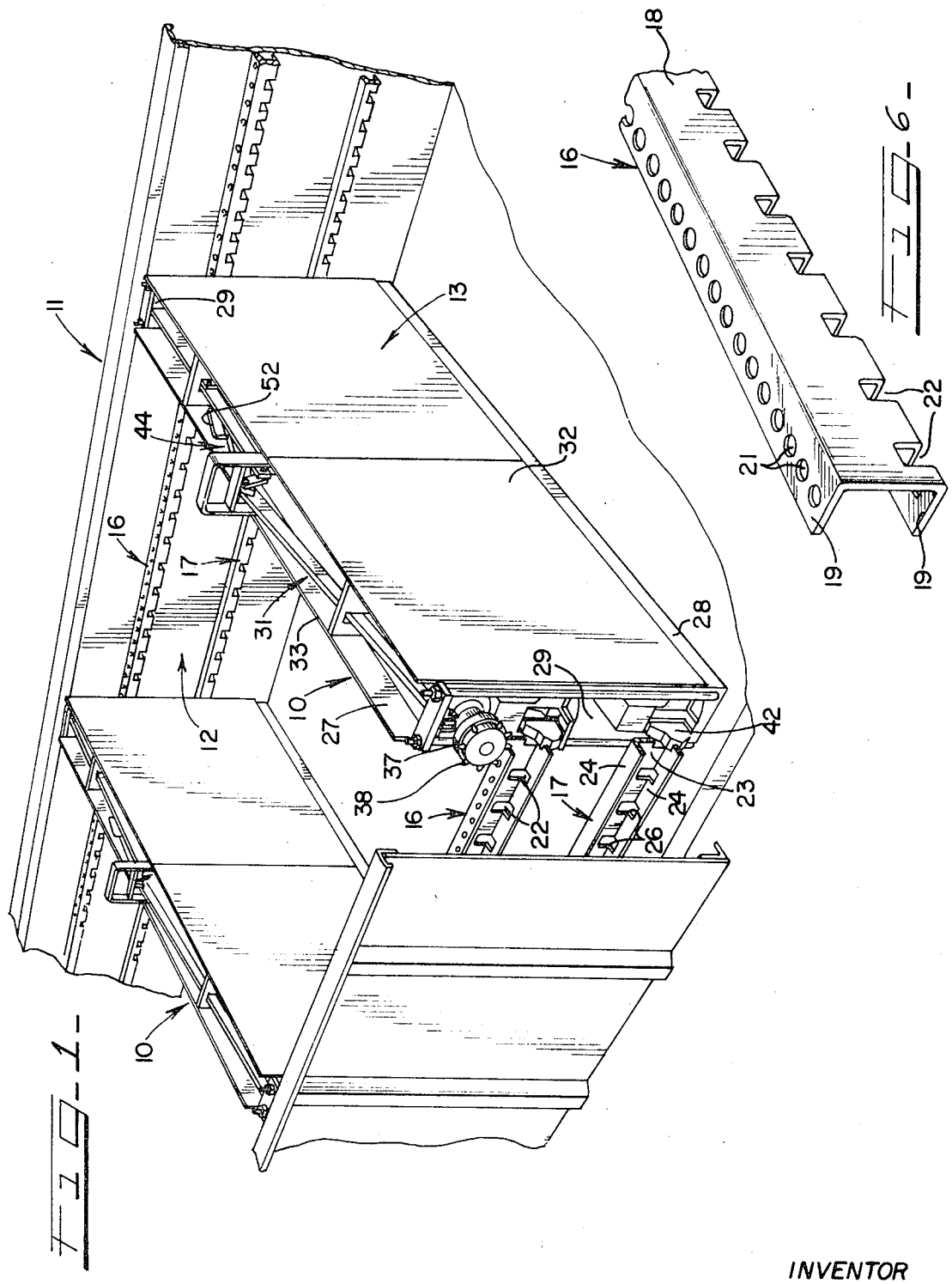

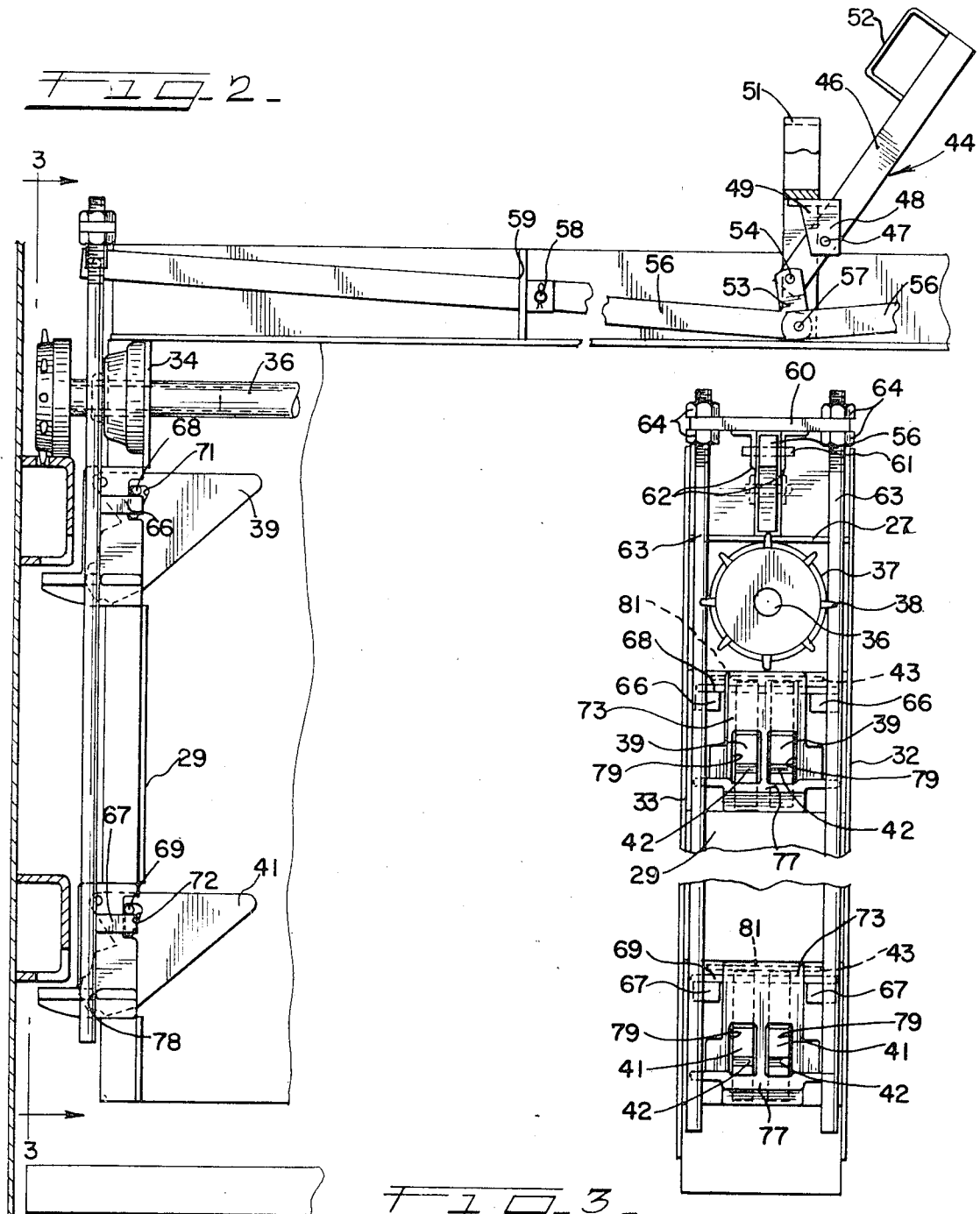

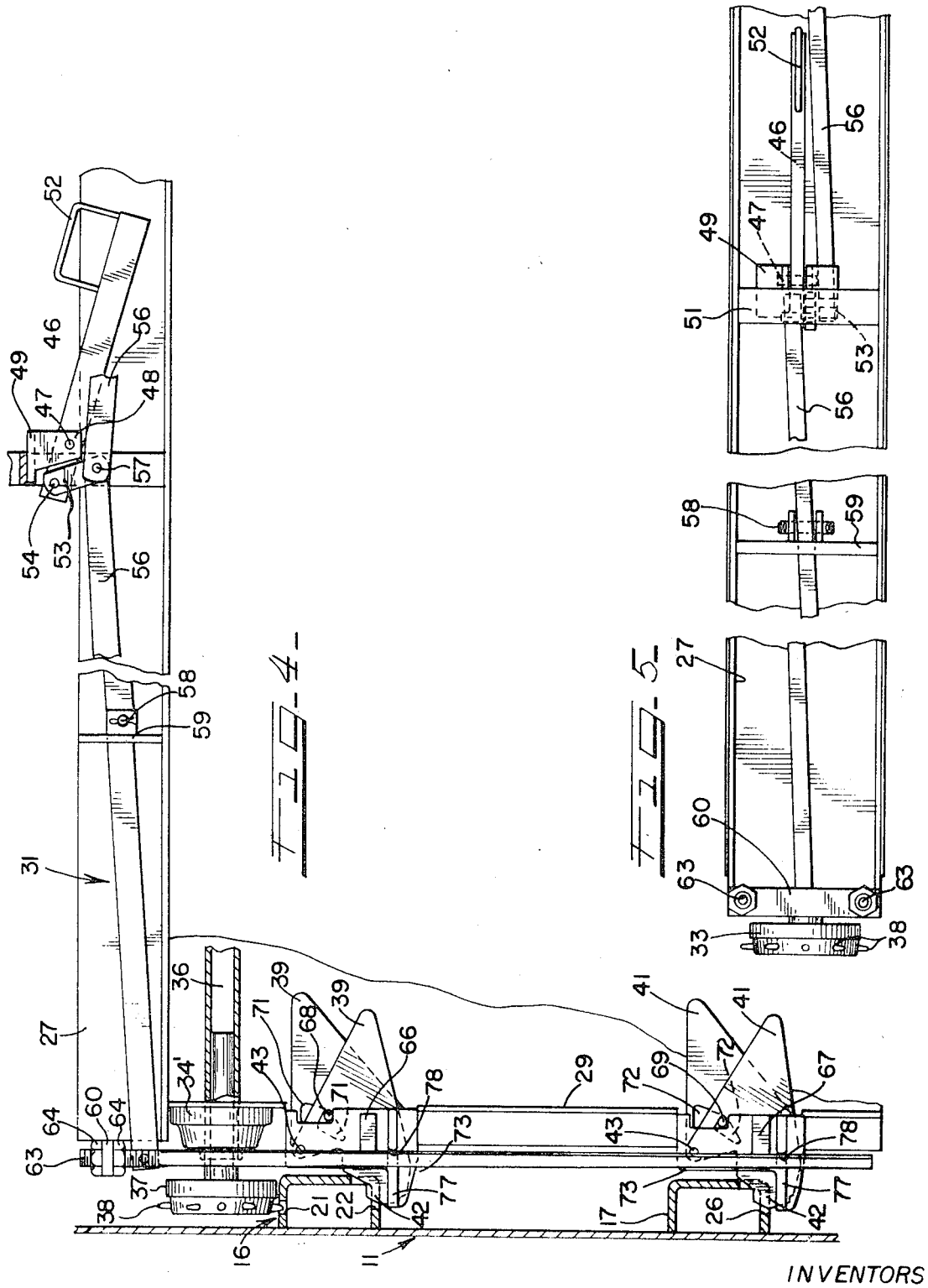

AUTOMATIC LOCKING MOVABLE BULKHEAD

The present invention relates to improvements in freight vehicles and more particularly to an improved bulkhead assembly for use in railway vehicles such as gondola cars.

The bulkheads in gondola cars are used to divide the car and restrain cargo or lading such as sheet, plate or coiled steel against longitudinal movement during transit.

Heretofore, such bulkhead assemblies have included two or four belt rails arranged in aligned pairs which are fastened along the sides of the vehicle. The belt rails served to maintain the bulkhead in an upright position and also to provide a keeper structure for locking the bulkhead against longitudinal movement. Such locking was generally accomplished by the manual insertion of pins through aligned openings in the bulkhead and rails or by the application of lock blocks along the opposite marginal edges of the bulkhead. Both of these prior methods are accomplished manually and frequently require the services of two men to lock the bulkhead in a fixed position.

These prior locking methods also frequently became dislodged during transit. This results in damage to the cargo and to the bulkhead.

By the present invention it is proposed to provide an improved bulkhead assembly including lengthwise extending rails mounted on the opposite sides of a vehicle and a bulkhead supported for movement on said rails. The bulkhead includes latching means which coact with keeper means provided on the rails. The latching means includes latch plates pivotally mounted along the sides of the bulkhead so as to be positioned by gravity for latching engagement with the keeper means along the rails. The latch means also includes means for retaining the latch plates out of engagement with the keeper means when the bulkhead is moved along the rails.

In some of the more specific aspects of the invention, the bulkhead includes a pair of sprocket wheels which are mounted along the opposite sides thereof. The sprocket wheels are engageable within openings provided in the rails for providing a positive drive during lengthwise movement of the bulkhead. The keeper means which may be in the form of notches are spaced to receive the latch plates at fixed intervals along the length of the vehicle. To achieve a maximum number of locked positions of the bulkhead along the rails, two sets of lock plates are provided with the centers substantially one-half the distance between the centers of the keepers. The width of each of the keepers is such that only one of the sets of latch plates is engageable with any one of the keepers.

The gravity actuated latch plates along the sides of the bulkhead are actuated by a single actuating mechanism which may be accessible at the center of the bulkhead. The actuating mechanism is arranged so that during movement of the bulkhead the latch plates are positively restrained out of engatement with the keepers.

Further features of the invention will be readily apparent from the following specification, claims and accompanying drawings, wherein like reference characters indicate like parts.

FIG. 1 is a fragmentary perspective view of a railway gondola car embodying the bulkhead assembly of the present invention.

FIG. 2 is a fragmentary view of a gondola car and the bulkhead assembly showing the latching means in an unlocked position.

FIG. 3 is an end view of the bulkhead taken generally along the lines 3—3 of FIG. 2.

FIG. 4 is a fragmentary front elevational view similar to FIG. 2 but showing the latching means in the locked position.

FIG. 5 is a fragmentary top plan view of the bulkhead with the latching means in the locked position.

FIG. 6 is a perspective view of one of the rails which are mounted along the sides of the vehicle.

Referring now to the drawings, the bulkhead assembly 10 of the present invention is shown incorporated in a railway vehicle such as a gondola car 11. Gondola cars of the type with which the bulkhead assembly are used, haul steelplates, coils and the like and the cars may be suitably covered by a cover unit (not shown). The bulkhead assembly 10 must be ruggedly constructed to withstand the abuse usually associated with such use.

The bulkhead assembly 10 comprises generally a rail subassembly 12 extending along each side of the vehicle 11 and a bulkhead 13 movable lengthwise of the vehicle on the rail subassembly 12.

The rail subassembly 12 includes an upper pair of rails 16—16 and a lower pair of rails 17—17. The upper rails 16—16 are each formed from a channel member of substantial cross section and include a web 18, and two depending legs 19. The free edges of the legs 19 are fixed to the sides of the vehicle as by welding.

As shown, the upper one of the legs 19 is provided with a plurality of equispaced openings 21. The spacing between the openings 21 corresponds to the pitch of the sprockets and the spacing is the pitch of the sprocket wheel and may be about 2 inches. Along the lower leg 19 there is formed a plurality of equispaced openings or notches 22 which extend into the webs 18. The notches 22 serve as keepers for latching the bulkhead 13 as more fully to be explained hereinafter.

The lower rails 17—17 are also channels, with each channel including a web 23 and legs 24—24. The edges of the legs 24—24 are fixed to the vehicle side as by welding. The lower legs 24 and the web 23 immediately contiguous thereto are formed with keeper notches 26. The keeper openings or notches 26 are in vertical alignment with the keeper openings or notches 22 in the rails 16—16.

The bulkhead 13 includes an upper channel 27, a lower channel 28, and side channels 29. The channels 27, 28 and 29 are of substantially U-shaped cross section and are disposed so that the legs extend outwardly to provide space to accommodate a latching mechanism 31 therein as more fully to be explained hereinafter.

Face sheets 32 and 33 are welded or otherwise fastened to the legs 30 of the channels 27, 28 and 29. Extending between each of the side channels 29 and journaled in bushings 34 fixed to the bight portions of the channels is a rotary shaft 36—see FIG. 4. Each end of the shaft 36 projects outwardly of the side channels 29—29 and has sprocket wheels 37 fixed thereon. The sprocket wheels 37—37 are rideable on the upper rails 16—16 with the angularly spaced sprockets 38 seatable within the openings 21. In this manner the sprocket wheels 37 serve to provide a positive drive for moving the bulkhead 13 along the rail beams 16—16. One of the sprockets is attached to a telescoping keyed shaft to allow variance in width of sidewalls of the car. The sprockets on the same shaft insure that the bulkhead does not twist out of perpendicular position to the sidewalls as it is being moved.

The latching mechanism 31 includes two sets of latch plates 39—39 and 41—41 along each of the sides of the bulkhead for engagement with the keeper notches 22 and 26. As shown in FIGS. 3 and 4, the latch plates 39 and 41 are each of generally triangular outline but each has a projecting locking nose 42 which is seatable within the notches 22 and 26. Pivot pins 43 pivotally support the latch plates 39—39 and 41—41 on the bulkhead as more fully to be explained hereinafter. The pivot pins 43 are disposed so that the remaining portions of the plates 39 and 41 serve as a counterbalance whereby the locking noses 42 are normally urged by the force of gravity toward the keeper notches 22 and 26.

A manual latch-operating mechanism 44 is provided to retain the latch plates 39 and 41 out of engagement with the keeper notches 22 and 26 during lengthwise movement of the bulkhead 13 in the car. The latch-operating mechanism 44 includes an actuating handle 46 which is pivotally supported at a distance spaced from one of the terminal ends by a pivot pin 47 carried by a pair of legs 48 of a bracket 49. The bracket 49 is fixed to an upwardly projecting U-shaped handle 51 fastened to the upper bulkhead channel 27. The actuating handle 46 includes a projecting grip 52 fixed to the other end.

One end of a link 53 is pivotally connected to the opposite end of the handle 46 by a pin 54. The other end of the link 53 is connected to one end of actuating levers 56 by means of a pin 57. The actuating levers 56 are rockably supported intermediate the ends thereof on a pin 58 carried by a bracket 59 fixed between the legs of the upper channel 27. At the opposite end, the actuating levers 56 are each pivotally connected to cross bars 60 by means of pins 61 carried by brackets 62 as shown in FIG. 3. Threaded into the ends of the crossbar 60 are lifting rods 63. The lifting rods 63 are selectively positioned and clamped in the cross bars 60 by means of nuts 64. It is to be noted that the rods 63 are disposed within the legs of the side channels 29—29 so as to be protected against abuse.

Fixed in vertically spaced relationship to the lifting rods 63 are inwardly projecting upper blocks 66 and lower blocks 67. Engageable between the upper pairs of blocks 66 and lower pairs of blocks 67 along each side of the bulkhead are transversely extending plate lifting shafts 68 and 69, respectively. As shown in FIGS. 2 and 3, the plate lifting shafts 68 and 69 are respectively accommodated within generally elongated and aligned slots 71—71 and 72—72 formed respectively in the latch plates 39—39 and 41—41.

In the unlatched position of the latch plates 39—39 and 41—41, the lifting rods 63 and the blocks 66 and 67 fixed thereto are operative to position the shafts 68 and 69 so that they are disposed in engagement with the upper surface of the slots 71—71 and 72—72 as shown in FIG. 2. In this position of the latch plate lifting shafts 68 and 69 the latch plates 39—39 and 41—41 are restrained against outward pivotal movement toward the rails 16 and 17 for engagement in the notches 22 and 26.

In connection with the latch plates 39—39 and 41—41, it is noted that the plates are housed within latch plate support housings 73. The housings 73 may be made by casting and are each of identical structure and suitably fixed within openings formed in the side channels 29—29 as by welding. The housings 73 each includes a horizontal lip 77 having a portion extending below the respective rails 16 and 17. The lip 77 includes shoulders 78 along each side which serve to guide the lower ends of the lifting bars 63 as shown in FIGS. 2 and 3. A pair of spaced side-by-side openings 79 accommodate the latch plates 39 and 41. At the upper portion of the housing 73 an intermediate web 81 provides a convenient mounting for the pivot pins 43 supporting the latch plates 39 and 41 along the sides of the bulkhead 13.

In operation, the latching mechanism 31 is in the position shown in FIGS. 2 and 3 with the manual actuating handle 46 elevated so that the latch plates 39 and 41 are retracted as heretofore explained. In this position of the latching mechanism 31, the bulkhead 13 may be rolled along the rails to a desired position. When in the desired position, the latch actuating handle 46 is rotated clockwise to the position shown in FIG. 4. Clockwise rotation of the handle 46 causes the link 53 to be elevated so that the actuating levers 56 are rocked about the pivot pins 58 to lower the outer ends of the levers 56. This causes the cross arms 60 connected to the outer ends of the levers to also be lowered whereby the lifting rods 63 and the lifting blocks 66 and 67 move downwardly out of engagement with the lifting shafts 68 and 69. The lifting shafts 68 and 69 are then free to slide in the elongated slots 71 and 72. Thus when one of the noses 42 of either one of the latch plates 39—39 or 41—41 is in alignment with a keeper notch 22 and 26, respectively, the counter balanced end is operative by the force of gravity to seat the noses 42 in the notches. The bulkhead 13 is thus locked along both sides to prevent further lengthwise movement.

As mentioned heretofore, the notches 22 and 26 are capable of accommodating only one of the sets of the latch plates 39—39 and 41—41 so that the other remains out of engagement as shown in FIG. 4. Such relative movement of the latch plates of each set 39—39 and 41—41 is made possible by the configuration of the slots 71 and 72. Moreover, the lengthwise spacing of the keeper notches 22 and 26 is substantially double the spacing of lock blocks 39—39 and 41—41.

Since the latches are pivotally mounted, they will accommodate side rails which are not exactly equidistant apart along length of car.

From the foregoing description taken in connection with the accompanying drawings, it is believed one versed in the art may readily understand the operation of the structure as set forth in the accompanying claims.

I claim:

1. In a freight vehicle having spaced sidewalls, a bulkhead assembly comprising a pair of lengthwise extending side rails mounted along each of said side walls and including a plurality of lengthwise spaced openings, a bulkhead extending transversely between said side walls, means movably supporting said bulkhead on said rails for lengthwise movement thereon, latch means mounted on said bulkhead for latching said bulkhead in a selective position lengthwise of said vehicle, said latch means including latch plate means freely pivotally mounted along the sides of said bulkhead so that the latch plate means are positioned by the force of gravity for latching engagement within said openings, and means on said bulkhead for overcoming the force of gravity to retain said latch plate means out of said latching position whereby said bulkhead may be moved lengthwise of said vehicle.

2. The invention as defined in claim 1 wherein said rails each includes a plurality of lengthwise spaced openings, and said latch plate means includes noses seatable with in said openings.

3. The invention as defined in claim 2 wherein said bulkhead includes sprocket wheel means mounted thereon, and wherein said rails include a plurality of sprocket openings for receiving the sprockets on said sprocket wheels.

4. The invention as defined in claim 2 wherein there are a plurality of latch plates at each of said openings, spaced relative to the spacing of the openings in said rails to provide locking positions at each of said openings corresponding to the number of latch plates.

5. The invention as defined in claim 4 wherein there are two side-by-side latch plate means of which only one of said latch plate means is seatable within one of said openings, and wherein means connect said two side-by-side latch plates for movement relative to each other.

6. The invention as defined in claim 5 wherein said connecting means comprises a lifting pin means slidable in elongated slots formed in each of said latch plate means so as to permit limited independent movement of said latch plate means between an aligned position out of seating engagement with said openings and a position wherein only one of said latch plate means is seated in a notch.

7. The invention as defined in claim 6 wherein said lifting pin is actuated by lifting means mounted for vertical movement along the sides of said bulkhead.

8. The invention as defined in claim 7 wherein said lifting means are simultaneously actuated by actuating linkage including an actuating handle mounted on the upper end of said bulkhead.

9. In a freight vehicle having spaced sidewalls, a bulkhead assembly comprising lengthwise extending rails mounted along the spaced sidewalls and including a plurality of lengthwise spaced openings, a bulkhead extending transversely between said sidewalls, means movably supporting said bulkhead for lengthwise movement of said vehicle, latch means mounted on said bulkhead to selectively position said bulkhead lengthwise of said vehicle, said latch means including side-by-side latch plate means freely pivotally mounted on said bulkhead so as to be movable under the influence of gravity to a position wherein one of said latch plate means is seatable within one of said openings and said other latch plate means is disposed adjacent thereto out of seating engagement with an opening, said latch plate means including a pair of alignable slots, and lifting pin means extending through said slots so as to permit said latch plate means to move relative to each other from an aligned position wherein said latch plate means are each maintained out of seating engagement with said openings, to another position wherein said one of said latch plate means is seated in an opening and said other latch plate means is located out of seating engagement with said opening.

10. The invention as defined in claim 9 wherein said latch plate means are located on the opposite sides of said bulkhead and wherein said latch plate means includes actuating linkage connected to said lift pins for simultaneously unseating and maintaining said latch plate means out of seating engagement with said openings.

* * * * *